Nov. 20, 1956
W. NIPKEN
2,771,297
ADJUSTABLE STOP FOR A COLLET OR THE LIKE
Filed July 7, 1955
2 Sheets-Sheet 1
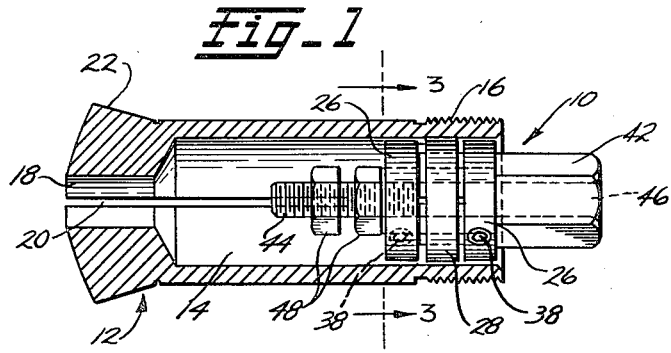
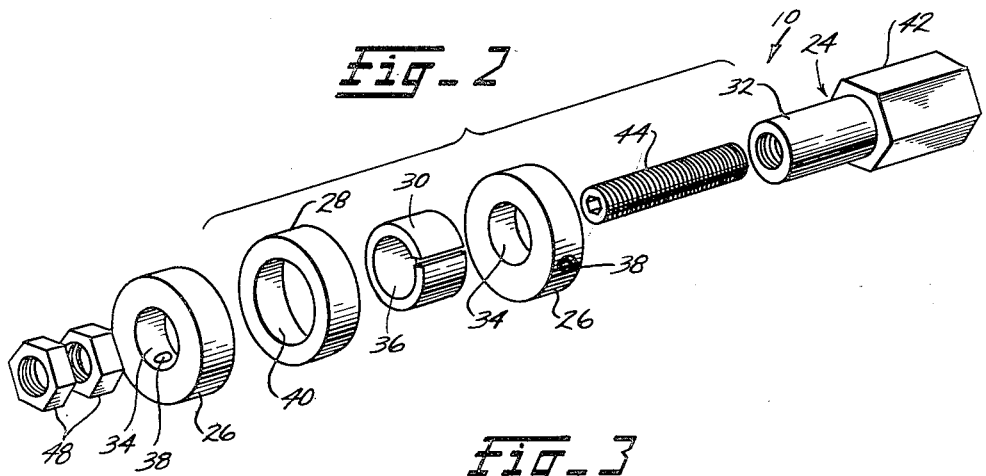
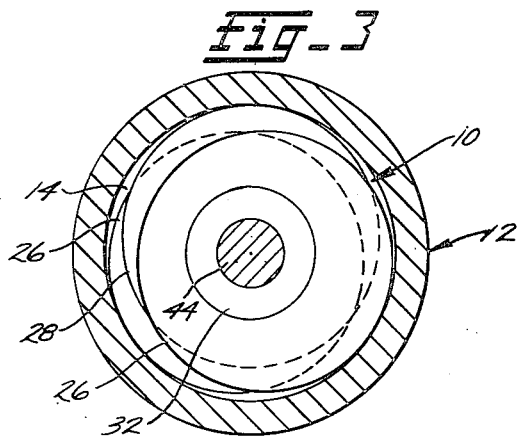
INVENTOR.
WALTER NIPKEN
BY
Roger B. McCormick
ATTORNEY Nov. 20, 1956 W. NIPKEN 2,771,297
ADJUSTABLE STOP FOR A COLLET OR THE LIKE
Filed July 7, 1955 2 Sheets-Sheet 2
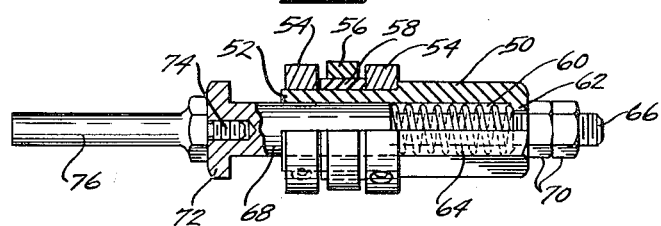
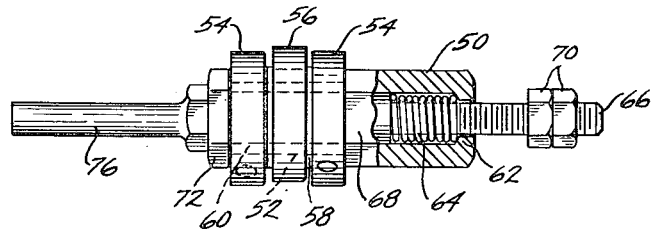
INVENTOR.
WALTER NIPKEN
BY Roger B. McCormick
ATTORNEY United States Patent Office 2,771,297
Patented Nov. 20, 1956

2,771,297
ADJUSTABLE STOP FOR A COLLET OR THE LIKE
Walter Nipken, Irvington, N. J.
Application July 7, 1955, Serial No. 520,429
6 Claims. (Cl. 279—102)

This invention relates to an adjustable stop for a collet or other device having a bore adapted to receive a workpiece. As will be apparent to those skilled in the art from the following specification, the stop may have other applications or uses. For example, the stop may be used as an internal wrench for gripping and rotating a pipe or the like.

It is the general object of the invention to provide an adjustable stop for a collet of standard manufacture, which stop is not only simple in make-up but is simple to operate and adjust.

Another object of the invention is to provide a stop of the aforedescribed type which is adapted to be very firmly engaged in the bore of a collet by a simple hand operation but which, despite its firm engagement with the collet, will not mark or scratch the collet or in any way interfere with the operation thereof.

Other objects and advantages of the invention will become apparent to those skilled in the art from the following detailed description taken in connection with the attached drawings wherein, Fig. 1 is a longitudinal cross-sectional view of a collet showing the adjustable collet stop of this invention located therein;

Fig. 2 is an exploded picture view of the adjustable stop shown in Fig. 1;

Fig. 3 is an enlarged transverse sectional view taken as indicated by the line 3—3 of Fig. 1;

Fig. 4 is a side view, partly in section, of an alternative form of construction incorporating a spring biased work ejector in the collet stop, the said ejector being shown in extended position; and Fig. 5 is a view similar to Fig. 4 showing the work ejector retracted.

In Fig. 1, the first embodiment of the adjustable stop is indicated by the numeral 10 and is shown located within the bore of a conventional collet 12, the bore being designated by the reference numeral 14. By "conventional" collet is meant one having external threads 16 on its rear end, a central opening 18 in its front end for receiving a workpiece, a plurality of circumaxially spaced longitudinal slots 20, 20 extending from its front end, and a forwardly diverging tapered periphery 22 around the said front end. When used in a lathe, the collet is engaged by the threads 16 to the lathe spindle and the workpiece is positioned in the collet opening 18. Then, the spindle is retracted to draw the collet into the lathe head-stock. A complementary tapered surface on the head-stock engages the tapered periphery 22 on the collet to close the front end of the collet on the workpiece, closing movement being accommodated by the slots 20, 20.

It is the purpose of the stop to locate the inner end of the workpiece in the collet so the outer or front end thereof will project a preselected distance for machining operation. The stop may be used to particular advantage in production work where the lathe or other machine tool is used repeatedly in the performance of similar machining operations on a plurality of identical workpieces.

The essential elements of my improved collet stop comprise a stop body 24, a pair of axially spaced apart eccentric rings 26, 26 which are supported on the forward portion of the stop body, and a third eccentric ring 28 which surrounds an eccentric split sleeve 30 located between the rings 26, 26.

The said forward portion of the stop body 24 is identified by the numeral 32 and is cylindrical, being adapted to slidably fit within eccentrically located openings 34, 34 in the rings 26, 26 and an eccentric opening 36 in the sleeve 30. The rings 26, 26 have tapped radial apertures wherein set screws 38, 38 are threaded to engage the stop body and thus fixedly locate the eccentric rings 26, 26 in selected positions on the cylindrical portion 32 of the stop body 24. The rings 26, 26 are respectively located forwardly and rearwardly of the sleeve 30 so as to permit free rotational and limited axial movement thereof with respect to the stop body. The forward or front ring 26 will thus be located closely adjacent the front end of the stop body. The intermediate eccentric ring 28 is not secured to the stop body. To the contrary, the ring 28 has an eccentric opening 40 sufficiently large to slidably and rotatably surround the split sleeve 30. Accordingly, the intermediate eccentric ring is capable of limited axial and unlimited rotational movement relative to the stop body 24 and the eccentrics 26, 26 and relative to the sleeve 30 which is capable of limited axial and unlimited rotational movement relative to the stop body 24 and the eccentrics 26, 26.

As will readily be understood by those skilled in the art, the collet stop 10 is secured within the bore 14 by inserting the stop body therewithin and then causing relative rotation between the eccentrics so that each eccentric will engage the wall of the bore on or near its high point (the point the greatest distance from the axis of the stop body 24). Now, the rings 26, 26 are identical and their high points are at equal distances from the axis or center line of the stop body. The eccentric 28 is preferably of equal circumference and equal eccentricity to the rings 26, 26. That is, the eccentric 28 if engaged over a sleeve which is concentric to the stop body 24, would have a high point located at a radial distance equal to the radial location of the high points on the rings 26, 26. Under such conditions, the largest bore engageable by the eccentrics 26, 26 and 28 would have a diameter equal to twice the common radial distance between the stop axis and the high points and the bore would be engaged when the high points are spaced 120° apart around the axis of the stop body. Under such conditions, the smallest bore engageable by the eccentrics 26, 26 and 28 would have a diameter slightly greater than the outside diameter of the said eccentrics and the bore would be engaged when the high points are circumaxially located close to one another.

However, in accordance with the present invention, the split eccentric sleeve 30 is provided to adapt the stop for use with collets having larger bores than the previously mentioned maximum. More specifically, the eccentric sleeve 30 is located within the freely rotatable eccentric ring 28 to add its eccentricity to the eccentricity of the said ring. When the high point on the sleeve 30 and the high point on the ring 28 are located in the same radial plane and on the same side of the stop axis, the high point on the said ring will be located from the axis at more than the radial distance separating the said axis and the high points on the eccentrics 26, 26. In addition, since the sleeve 30 and ring 28 are relatively rotatable, the high point on the ring 28 will not always be located the maximum distance from the stop axis so more variation is permitted in use of the stop.

In further accord with the present invention, the stop 10 can be firmly engaged in the bore of a collet 12 by a simple hand operation. That is, the stop body 24 has a rear portion 42 which is larger than the cylindrical forward portion 32 and which has flat sides (preferably hexagonal) for convenient hand or wrench gripping. When the portion 42 is grasped, the cylindrical portion 32 and the eccentrics are inserted within the collet bore from the rear end thereof. Then, the stop body is given a quick turn causing, by the forces of inertia, the ring 28 and sleeve 30 to be rotated relative to each other and relative to the other fixed eccentrics 26, 26. The rotation will cease, generally within ½ revolution, when the rings 26, 26 and 28 all engage the wall of the collet bore. It has been found that such engagement is so firm as to entirely overcome any tendency toward inadvertent disengagement during operation of the collet. On the other hand, the stop can be disengaged by hand when force is applied to rotate the stop in a direction opposite to initial rotation. In operation of the collet, no appreciable rotative forces are applied to the stop tending to disengage the same. All appreciable forces are directed axially and are not of sufficient magnitude to shift the stop. It takes a very great axial force to move the stop from hand engaged position.

It will be readily understood that if the stop is to be used in a collet having a bore of diameter only slightly greater than the diameter of the eccentrics 26, 26 and 28, the eccentrics should initially be located on the stop body 25 with their high points adjacent each other. On the other hand, if the stop is to be used in a collet having a relatively large diameter bore, the eccentrics 26, 26 are secured on the stop body with their high points circumaxially spaced by about 120° and with the high point on the eccentric 28 located within the said angle. Then, the quick turn of the stop body will bring the high point on the ring 28 outside of the stated angle when all three rings engage the wall of the bore.

It will also be understood that the forward or inner end of the stop is engageable by the workpiece. Accordingly, before the stop is initially positioned in the collet, a workpiece should be extended into the collet opening 18 so that it will project forwardly from the collet the desired or selected distance. Then, the stop 10 is inserted in the bore 14 from the rear end of the collet to engage the workpiece. Upon engaging the workpiece, the stop body is given the aforedescribed quick turn to cause the eccentrics to engage the bore wall. Thereafter, each identical workpiece inserted in the collet to engage the stop will project forwardly from the collet the same desired or preselected distance.

In further accord with the invention, means are provided for adjusting the effective length of the stop. The said means comprise a screw 44 which is threaded into the tapped front end of a central bore 46 in the stop body 24. By threading the screw 44 into the bore 46 it can be made to extend forwardly of the body a selected distance for engagement by the workpiece. Lock nuts 48, 48 are provided on the screw 44 to lock the same in adjusted position. In addition, the forward nut 48 can be positioned on the screw 44 for engagement by a hollow workpiece which would not or could not engage or abut the screw.

The alternative form of construction in an adjustable collet stop shown in Figs. 4 and 5 is similar to the first described embodiment but incorporates a spring biased plunger for ejecting the workpiece from the collet when the collet is released. The alternative form includes the essential elements of the first described embodiment comprising a stop body having a flat-faced hand grip portion 50 and a forwardly projecting cylindrical portion 52 upon which are mounted a pair of spaced apart eccentric rings 54, 54 and an intermediate eccentric ring 56 which surrounds an eccentric split sleeve 58. The general make-up of the stop body and eccentrics and their operation are identical to their counterparts of the first described embodiment and, therefore, a specific description thereof will not be repeated. However, it is important to observe that the stop body 50 has an enlarged central bore 60 which is not threaded at its forward end. The rear end of the stop body is formed to provide a shoulder 62 at the rear end of the bore 60 for seating a spring 64.

The spring 64 surrounds the reduced diameter threaded rear end 66 of a plunger 68. The said threaded end 66 of the plunger projects rearwardly of the stop body and a pair of lock nuts 70, 70 are threaded on the projecting end to adjust the force on the spring 64 and to adjust the stroke of the plunger 68. The forward end of the plunger 68 projects from the stop body and is provided with a flanged head 72 which will engage the forward end of the stop body when the spring is compressed as shown in Fig. 5. The said forward end of the plunger also has a tapped central opening receiving a threaded appendage 74 which projects rearwardly from a stop extension 76.

It will be quite apparent from Figs. 4 and 5 of the drawings that the detachable stop extension 76 projects forwardly from the plunger 68 for engagement by a workpiece inserted within the collet. In the preferred manner of operation, the workpiece is inserted within the collet with sufficient force to compress the spring 64 so that the flanged head 72 on the plunger will engage the forward end of the stop body as shown in Fig. 5. Then, the collet is drawn into gripping engagement with the workpiece for the machining operation. When the machining operation has been completed and the collet is released, the spring 64 will bias the plunger 68 forwardly to thrust the workpiece out of the collet.

The advantages of both embodiments of an adjustable collet stop construction in accordance with the present invention will be apparent from the foregoing description. Among the most important advantages are simplicity of manufacture, simplicity and ease of operation, the adaptability of the stops to a plurality of collets having different size bores, and the ability of the stops to firmly engage the collet bore without marking or in any way defacing the same.

A less apparent advantage and additional use of the collet stops will be understood when it is explained that either embodiment of the collet stop may be inserted within the end of a pipe or other hollow member and used as an internal wrench for turning the pipe or hollow member. That is, the stop may be inserted within the open end of a pipe or the like and engaged by a quick turn of the stop body in the direction in which it is desired to turn the pipe. After engagement of the eccentrics with the inner wall of the pipe, the pipe can then be turned in the same direction by engaging the hand grip portion of the stop body with a suitable wrench. It has been found that forces of great magnitude may be applied in using the stop as an internal gripping wrench without causing damage either to the stop or to the pipe or other member with which it is engaged. After the desired turning forces have been applied, the stop can easily be disengaged by a slight turn or rotation of the stop body in the opposite direction.

While the invention has been described with reference to the drawings showing two specific embodiments, it will be understood that modification or change can be accomplished within the spirit and scope of the invention as reflected in the following claims.

I claim as my invention:

1. A stop adapted to be manually adjustably positioned in the bore of a collet for engagement by a workpiece which is extended a preselected distance into the collet from the front end thereof, the said stop comprising a stop body having a forwardly projecting cylindrical portion and a rear portion providing a hand grip, a pair of rings having eccentrically located openings surrounding the cylindrical portion of the stop body and detachably secured thereto in axially spaced apart locations, a sleeve located between said pair of rings and having an eccentric opening surrounding the said cylindrical portion to provide for free rotation of the sleeve thereon, and a third ring having an eccentric opening surrounding the said sleeve to provide for free relative rotation between said third ring and said sleeve, the stop being positioned in the collet bore by extending the stop body forwardly therein and by a quick turn of the stop body to engage the three eccentric rings with the wall of the collet bore.

2. A stop adapted to be manually and adjustably positioned in the bore of a collet for engagement by a workpiece which is extended a preselected distance into the collet from the front end thereof, the said stop comprising a stop body having a forwardly projecting cylindrical portion and a rear portion provided with flat surfaces for wrench and hand grip, a pair of rings of substantially equal outside diameters having eccentrically located openings surrounding the cylindrical portion of the stop body and detachably secured thereto in axially spaced apart locations, a longitudinally split sleeve located between the said pair of rings and having an eccentric opening surrounding the said cylindrical portion to provide for free rotation of the sleeve thereon, and a third ring having an eccentric opening surrounding the said sleeve to provide for free relative rotation between said third ring and said sleeve, the stop being positioned in the collet bore by extending the stop body forwardly therein and by a quick turn of the stop body to engage the three eccentric rings with the wall of the collet bore.

3. A stop adapted to be manually adjustably positioned in the bore of a collet for engagement by a workpiece which is extended a preselected distance into the collet from the front end thereof, the said stop comprising a stop body having a forwardly projecting cylindrical portion and a rear portion providing a hand grip and also having a longitudinally extending bore, a pair of rings having eccentrically located openings surrounding the cylindrical portion of the stop body and detachably secured thereto in axially spaced apart locations, a sleeve located between said pair of rings and having an eccentric opening surrounding the said cylindrical portion to provide for free rotation of the sleeve thereon, a third ring having an eccentric opening surrounding the said sleeve to provide for free relative rotation between said third ring and said sleeve, and means adjustably located in the bore of the stop body and projecting forwardly therefrom for engagement by a workpiece, the stop being positioned in the collet bore by extending the stop body forwardly therein and by a quick turn of the stop body to engage the three eccentric rings with the wall of the collet bore.

4. A stop adapted to be manually adjustably positioned in the bore of a collet for engagement by a workpiece which is extended a preselected distance into the collet from the front end thereof, the said stop comprising a stop body having a forwardly projecting cylindrical portion and a rear portion providing a hand grip and also having a longitudinally extending bore which is threaded at the front end of the stop body, a pair of rings having eccentrically located openings surrounding the cylindrical portion of the stop body and detachably secured thereto in axially spaced apart locations, a sleeve located between said pair of rings and having an eccentric opening surrounding the said cylindrical portion to provide for free rotation of the sleeve thereon, a third ring having an eccentric opening surrounding the said sleeve to provide for free relative rotation between said third ring and said sleeve, and a screw threaded into the forward end of the stop body bore to provide a forwardly projecting adjustable extension for engagement with a workpiece, the stop being positioned in the collet bore by extending the stop body forwardly therein and by a quick turn of the stop body to engage the three eccentric rings with the wall of the collet bore.

5. A stop adapted to be manually adjustably positioned in the bore of a collet for engagement by a workpiece which is extended a preselected distance into the collet from the front end thereof, the said stop comprising a stop body having a forwardly projecting cylindrical portion and a rear portion providing a hand grip and also having a longitudinally extending bore and means adjacent the rear end of the bore defining an annular spring seat, a plunger located within the stop body bore and projecting forwardly and rearwardly therefrom, the forwardly projecting portion of said plunger being provided with a flanged head for engaging the forward end of the stop body when the plunger is thrust rearwardly therein, the rearwardly projecting portion of said plunger being of reduced diameter within the stop body bore and being threaded to receive an adjustable lock nut rearwardly of the stop body, a coil spring surrounding the reduced diameter portion of the said plunger within the stop body bore and biasing the said plunger forwardly therein, a pair of rings having eccentrically located openings surrounding the cylindrical portion of the stop body and detachably secured thereto in axially spaced apart locations, a sleeve located between said pair of rings and having an eccentric opening surrounding the said cylindrical portion to provide for free rotation of the sleeve thereon, and a third ring having an eccentric opening surrounding the said sleeve to provide for free relative rotation between the said third ring and the said sleeve, the stop being positioned in the collet bore by extending the stop body forwardly therein and by a quick turn of the stop body to engage the three eccentric rings with the wall of the collet bore, the spring biased plunger being retracted when engaged by a workpiece and being adapted to eject the workpiece from the collet.

6. A stop adapted to be manually adjustably positioned in the bore of a collet for engagement by a workpiece which is extended a preselected distance into the collet from the front end thereof, the said stop comprising a stop body having a forwardly projecting cylindrical portion and a rear portion providing a hand grip and also having a longitudinally extending bore and means adjacent the rear end of the bore providing an annular spring seat, a plunger slidably located within the stop body bore and projecting forwardly and rearwardly therefrom, the forwardly projecting portion of said plunger being provided with a flanged head engageable with the forward end of the stop body when the plunger is thrust rearwardly therein and said forward end of the plunger being provided with a centrally located tapped opening, the rearwardly projecting portion of said plunger being threaded and of reduced diameter within the stop body bore, a stop nut adjustably secured to the rearwardly projecting threaded end portion of the plunger, a coil spring surrounding said reduced diameter portion of the plunger within the stop body bore and seated on said spring seat to bias the plunger forwardly, a pair of rings having eccentrically located openings surrounding the cylindrical portion of the stop body and detachably secured thereto in axially spaced apart locations, a sleeve located between said pair of rings and having an eccentric opening surrounding the said cylindrical portion to provide for free rotation of the sleeve thereon, a third ring having an eccentric opening surrounding the said sleeve to provide for free relative rotation between said third ring and said sleeve, and a forwardly projecting stop extension threaded into the tapped opening in the forward end of the plunger for engagement with a workpiece inserted in the collet, the stop being positioned in the collet bore by extending the stop body forwardly therein and by a quick turn of the stop body to engage the three eccentric rings with the wall of the collet bore, the plunger being retracted when a workpiece engages the stop extension and thrusts the same rearwardly and the said plunger being adapted to eject the workpiece from the collet when the workpiece is released.

References Cited in the file of this patent

UNITED STATES PATENTS

| | | |
|---|---|---|
| 2,397,382 | Smith | Mar. 26, 1946 |
| 2,432,059 | Zipser | Dec. 2, 1947 |

FOREIGN PATENTS

| | | |
|---|---|---|
| 567,390 | France | Dec. 5, 1923 |